United States Patent
Strelioff et al.

(10) Patent No.: US 6,834,223 B2
(45) Date of Patent: Dec. 21, 2004

(54) ROLL CONTROL SYSTEM AND METHOD FOR A SUSPENDED BOOM

(75) Inventors: WIlliam Strelioff, Saskatoon (CA); Dean Hockley, Saskatoon (CA); Gordon Lee, Saskatoon (CA)

(73) Assignee: Norac Systems International, Inc., Saskatoon (CA)

( * ) Notice: Subject to any disclaimer, the term of this patent is extended or adjusted under 35 U.S.C. 154(b) by 12 days.

(21) Appl. No.: 10/360,877

(22) Filed: Feb. 10, 2003

(65) Prior Publication Data

US 2004/0158381 A1 Aug. 12, 2004

(51) Int. Cl.$^7$ ............... B05B 15/08; B05B 1/20; B05B 15/10
(52) U.S. Cl. ............ 701/50; 701/213; 342/357.13; 239/167
(58) Field of Search .......... 701/50, 213; 342/357.13, 342/357.17; 239/167, 164, 168, 161, 173, 159

(56) References Cited

U.S. PATENT DOCUMENTS

| | | | | |
|---|---|---|---|---|
| 3,633,850 A | * | 1/1972 | Feldman | 244/17.11 |
| 4,709,857 A | * | 12/1987 | Wilger | 239/164 |
| 5,348,226 A | | 9/1994 | Heiniger et al. | 239/1 |

(List continued on next page.)

FOREIGN PATENT DOCUMENTS

| | | |
|---|---|---|
| CA | 1170228 | 7/1984 |
| CA | 1230866 | 12/1987 |
| CA | 1258835 | 8/1989 |
| CA | 1303568 | 6/1992 |
| DE | 4140254 | 6/1993 |
| EP | 0157592 | 10/1985 |
| EP | 0922385 | 6/1999 |
| EP | 1167095 | 2/2002 |
| FR | 2562378 | 10/1985 |
| FR | 2795913 | 1/2001 |
| JP | 2002034422 | 2/2002 |
| WO | WO 97/37533 | 11/1997 |
| WO | WO 98/06257 | 2/1998 |
| WO | WO 99/37405 | 7/1999 |
| WO | WO 99/63810 | 12/1999 |
| WO | WO 00/15348 | 3/2000 |
| WO | WO 00/42840 | 7/2000 |
| WO | WO 00/74481 | 12/2000 |

*Primary Examiner*—Tan Q. Nguyen
*Assistant Examiner*—Dalena Tran
(74) *Attorney, Agent, or Firm*—Cassan Maclean

(57) ABSTRACT

A roll control system is provided for controlling a roll position of a boom rotatably coupled to a support frame, the boom comprising left and right wing sections (where the roll of the boom refers to a clockwise or counterclockwise rotation of said boom relative to the support frame). A roll control mechanism is configured for rotating the boom relative to the support frame in response to a roll control signal. Wing section position measuring apparatus is configured for producing a right wing signal correlatable to a distance between the right wing section and a rightwing reference position and a left wing signal correlatable to a distance between the left wing section and a left wing reference position. Boom roll position measuring apparatus is configured for producing a boom roll signal correlatable to a roll position of the boom relative to a boom roll reference position. A controller is configured for: (i) identifying a wing section differential value and a boom roll value derived from the right and left wing signals and the boom roll signal, respectively; (ii) identifying a boom roll control error value derived from the wing section differential value and the boom roll value, the boom roll error control value being configured for deriving therefrom the roll control signal. Advantageously, the roll control system of the invention takes into account both the height differential (relative to a ground reference) between the left and right wings and the boom roll position relative to a neutral (reference) position.

17 Claims, 7 Drawing Sheets

U.S. PATENT DOCUMENTS

| | | | |
|---|---|---|---|
| 5,507,435 A | 4/1996 | Benest | 239/1 |
| 5,794,852 A * | 8/1998 | Wald et al. | 239/167 |
| 5,927,606 A | 7/1999 | Patterson | 239/167 |
| 5,988,528 A | 11/1999 | Krohn et al. | 239/168 |
| 5,992,759 A | 11/1999 | Patterson | 239/167 |
| 6,042,020 A | 3/2000 | Weddle | 239/166 |
| 6,056,210 A | 5/2000 | Weddle | 239/159 |
| 6,119,963 A | 9/2000 | Bastin et al. | 239/168 |
| 6,199,000 B1 * | 3/2001 | Keller et al. | 701/50 |
| 2001/0022322 A1 | 9/2001 | Guesdon | 239/167 |
| 2002/0020760 A1 | 2/2002 | Beggs | 239/166 |
| 2002/0030119 A1 | 3/2002 | Proharam | 239/168 |
| 2002/0030120 A1 | 3/2002 | Guesdon | 239/168 |
| 2002/0038548 A1 | 4/2002 | Sharkness et al. | 60/469 |
| 2002/0059787 A1 | 5/2002 | Viaud | 56/10.2 |

\* cited by examiner

ROLL CONTROL SYSTEM AND METHOD FOR A SUSPENDED BOOM

FIELD OF THE INVENTION

This invention relates generally to the field of control systems for controlling the position of a suspended boom and, more specifically, to a control system for automatically controlling the roll of a boom.

BACKGROUND TO THE INVENTION

Suspended booms are used in many different industries for different purposes. In the agricultural industry, for example, a suspended boom sprayer is commonly used for the application of pesticides, herbicides and fertilizers. Spray tips are mounted to the sprayer boom at a predetermined spacing to promote an even application of the material being applied. In order to achieve a reasonably uniform application of such material it is necessary that the spray tips be maintained at a constant (or near constant) distance from the ground or vegetation to which the material is being applied. Generally, the spray tips used for these applications are designed for use at a specific height for optimum performance and application uniformity.

Maintaining a uniform height at all points of a boom is a difficult challenge. The boom of a boom sprayer is suspended mechanically from the frame of the sprayer and, as the sprayer moves over uneven ground, different adjustments of position are required to maintain a uniform boom height over the whole length of the boom. Any of three independent position adjustment mechanisms are typically used for this. First, a vertical height adjustment mechanism is known for lifting (or lowering) the entire boom assembly in a vertical direction. Second, left and right wing tip adjustment mechanisms are known for independently lifting (or lowering) either wing section of the boom. Third, a roll adjustment mechanism is known for rotating the entire boom in a clockwise, or counterclockwise, direction about an axis pointing in the forward direction (this being useful to keep the entire boom parallel to the ground when a height error is introduced by the supporting vehicle as its wheels drive over uneven ground). To date, the known roll adjustment mechanisms have used either passive means for controlling the roll (e.g. in the form of a rotation or pendulum coupling between the sprayer frame and the center boom, together with a damper for dampening the rotational action and centering the boom so that the boom will eventually approach a parallel condition with the sprayer main frame) or a manually operated hydraulic cylinder (e.g. directly or indirectly with the use of springs and dampers). Prior attempts to automate the roll position of the boom have been largely unsuccessful and there is a need in the industry for an effective, automated roll control system.

Controlling the boom roll provides a number of advantages which serve to improve the performance of a boom operator and faster operation. Specifically, roll control can remove errors induced by the vehicle, when the vehicle moves over uneven ground and, at the same time, it may also serve to adjust the tips by increasing the rate of adjustment of the tip heights when a roll error exists. Automatically controlling boom roll can also help to more quickly stabilize the roll action of the boom (i.e. the back and forth swinging of the boom caused by the pendulum action of a roll), as compared to passive control means relying only on the friction and mechanical dampers to reduce this swinging, thereby producing a more stable boom, with a more consistent height, in all field conditions.

There is a need for improved automated boom roll control means. There is also a need for means by which a combination of boom position parameters may be considered for purposes of controlling the boom roll. Further, there is a need for means by which real time operating parameters are used to control the boom roll.

SUMMARY OF THE INVENTION

In accordance with the invention there is provided a roll control system for controlling a roll position of a boom coupled to a support frame to permit clockwise or counter-clockwise rotation relative thereto, the boom comprising left and right wing sections and the roll position representing a measure of such rotation. A roll control mechanism is configured for rotating the boom relative to the support frame in response to a roll control signal provided thereto. Wing section position measuring apparatus is configured for producing a right wing signal correlatable to a distance between the right wing section and a right wing reference position (e.g. ground) and a left wing signal correlatable to a distance between the left wing section and a left wing reference position (e.g. ground). Boom roll position measuring apparatus is configured for producing a boom roll signal correlatable to a roll position of the boom. A controller (e.g. a microprocessor) is configured for identifying a wing section differential value and a boom roll value derived from the right and left wing signals and the boom roll signal, respectively, and for identifying a boom roll control error value derived from the wing section differential value and the boom roll value, the boom roll control error value being configured for deriving therefrom the roll control signal. Preferably, the wing section differential value is scaled by a first scaling factor and the boom roll value is scaled by a second scaling factor.

The wing section position measuring apparatus may comprise a first distance measuring component configured for producing the right wing signal and a second distance measuring component configured for producing the left wing signal. The boom roll position measuring apparatus may comprise a third distance measuring component configured for producing the boom roll signal. The first, second and third measuring components may comprise ultrasonic sound echo sensors. The first measuring component is preferably located at or near a terminal end of the left wing section and the second measuring component is preferably located at or near a terminal end of the right wing section.

In one embodiment, the roll control mechanism comprises a roll frame coupled to the support frame by a pivotal coupling and by extension/retraction means (e.g. a hydraulic valve and cylinder) spaced from the pivotal coupling. In this embodiment the third measuring component is located on the roll frame and preferably at least one spring and a damper couple the roll frame and the boom.

Preferably, the controller compares the boom roll control error value to a deadband value and sets the boom roll control error value to zero when the comparison identifies that the boom roll control error value is less than the deadband value.

In accordance with a further aspect of the invention there is provided a method for controlling the roll position of a boom comprising, producing a right wing signal correlatable to a distance between the right wing section and a right wing reference position; producing a left wing signal correlatable to a distance between the left wing section and a left wing reference position; producing a boom roll signal correlatable to a roll position of the boom; deriving a wing section differential value and a boom roll value from the right and left wing signals and the boom roll signal, respectively; deriving a boom roll error control value from the wing section differential value and the boom roll value; producing a roll control signal using the boom roll error control value; and, rotating the boom relative to the support frame in response to the roll control signal. Preferably, the wing section differential value is scaled by a first scaling factor and the boom roll value is scaled by a second scaling factor. Preferably, the boom roll control error value is compared to a deadband value and the boom roll control error value is set to zero when the comparison identifies that the boom roll control error value is less than the deadband value.

DESCRIPTION OF THE DRAWINGS

The present invention is described below with reference to the following drawings in which like reference numerals refer throughout to like elements.

FIG. 1 shows a known (prior art) adjustment whereby the entire boom is moved (i.e. lifted or lowered) in a vertical direction as indicated by the arrows. This vertical control adjustment is typically accomplished with a vertical rack or a parallel linkage and a main boom hydraulic lift cylinder. Automation of this height may be accomplished by using a distance sensor at the center section of the boom in conjunction with a controller for controlling the hydraulic flow to the main boom lift cylinder;

FIG. 2 shows a further known (prior art) adjustment whereby one or both of the left and right boom tips is lifted or lowered (as indicated by the arrows) so as to allow the sprayer sections to follow the ground contour. Each wing tip adjustment is typically done by using left and right boom hydraulic lift cylinders and hinge point between the center section of the boom and the left and right boom sections, respectively. Such wing tip adjustments may be automated by using distance sensors at the wing tips with a controller for controlling the hydraulic flow to each of the left and right boom hydraulic lift cylinders;

FIG. 3 shows a further known (prior art) adjustment whereby the entire boom is rotated in a clockwise or counterclockwise direction about an axis pointing in the forward direction, this rotational position being referred to herein as the boom roll position (in FIG. 3 this rotation is indicated by the double-headed arrow);

DESCRIPTION OF THE ILLUSTRATED EMBODIMENT

Figure 1:
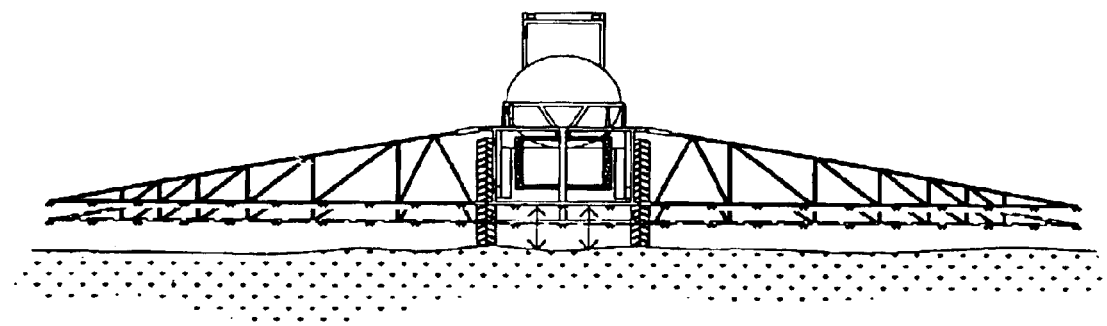
FIGS. 1 to 3 show the basic types of known (prior art) boom adjustments that can be made to adjust the position/height of the boom over a target (whether ground, foliage or other applicable target).
Figure 2:
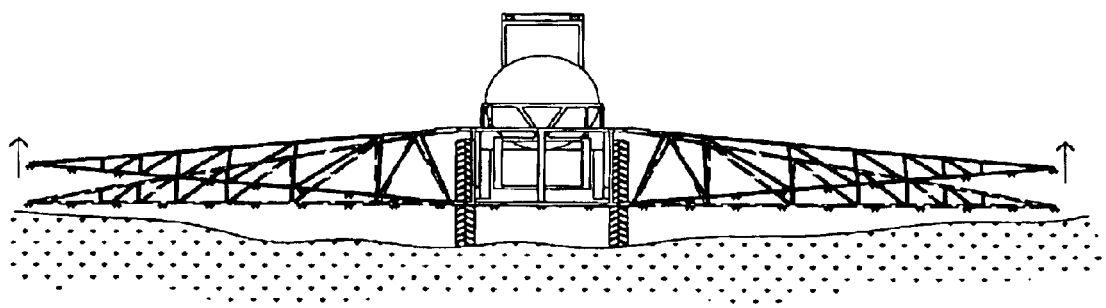

An embodiment of the roll control system of the invention is illustrated in the drawings and described hereinafter. The function of the roll control system is to control a roll position of a boom rotatably coupled to a support frame, the "roll" position referring to a clockwise or counterclockwise rotation of the boom relative to the support frame.

Figure 4:
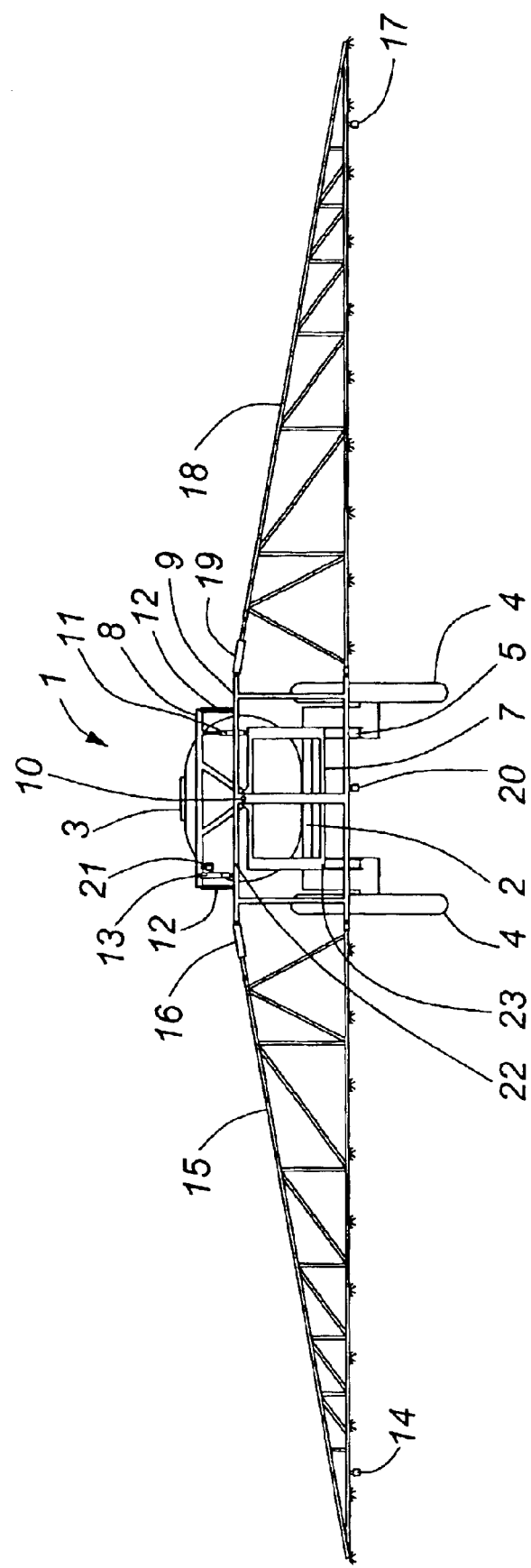
FIG. 4 is a front elevation view of a boom assembly attached to a sprayer and having a boom height control system, with a roll control component, in accordance with invention installed therein.
Figure 5:
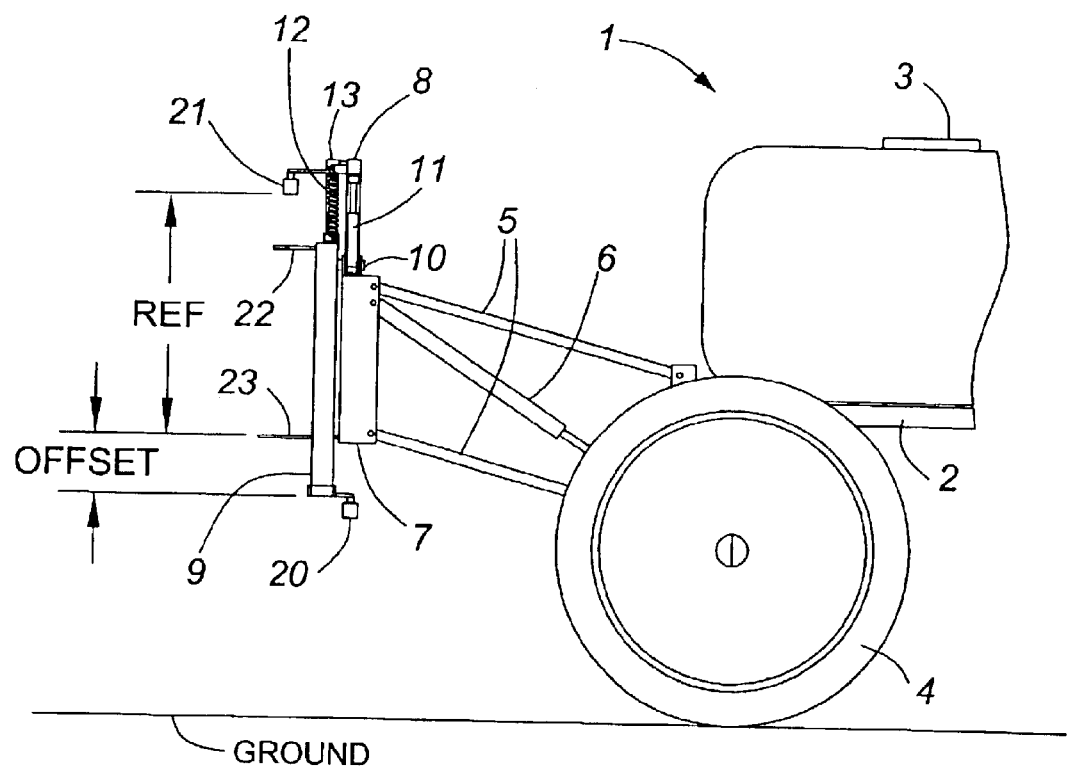
FIG. 5 is a side view of the apparatus of FIG. 4 including the boom assembly and boom height control system thereof.
Figure 6:
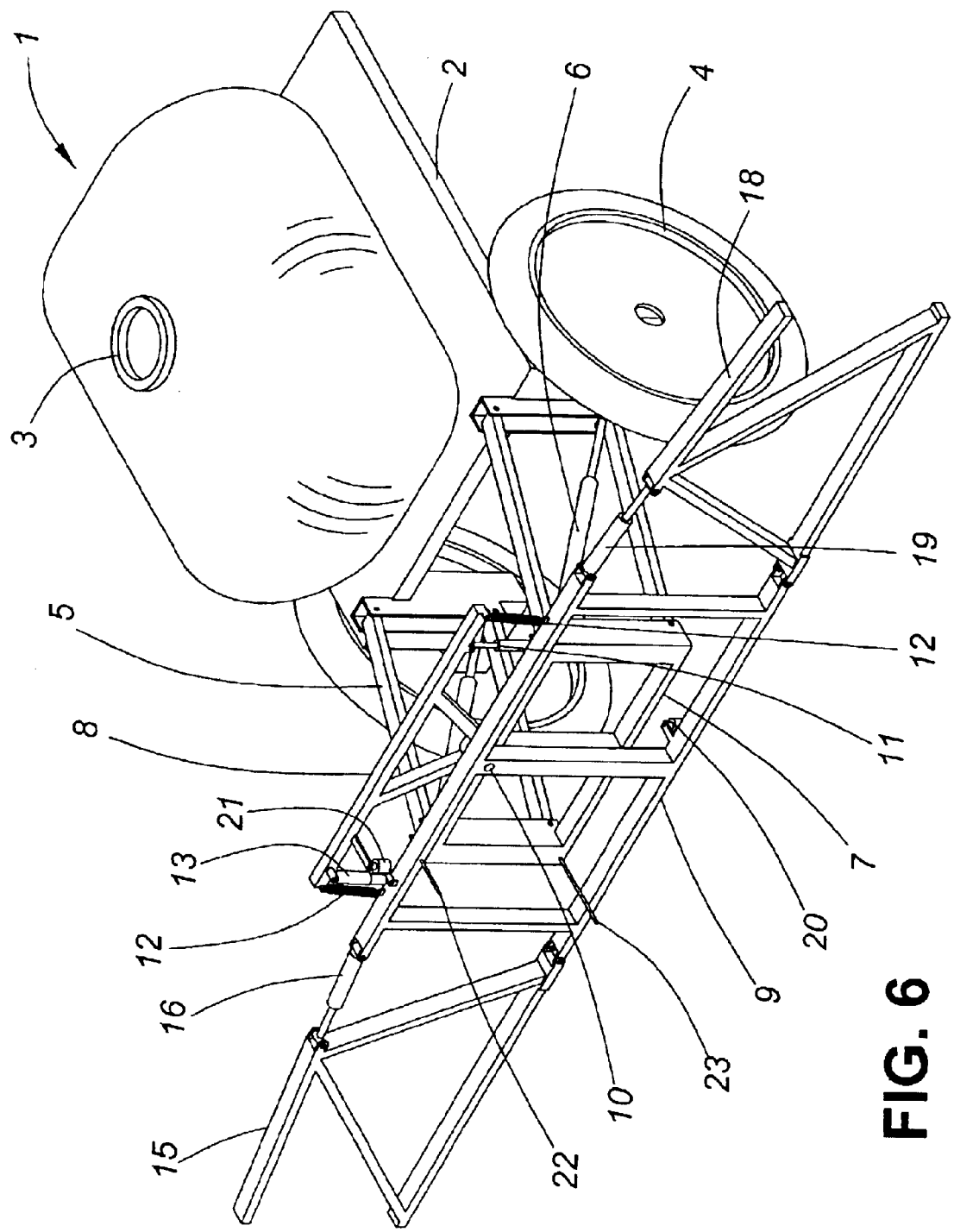
FIG. 6 is a perspective view of the apparatus of FIG. 4 including the boom assembly and boom height control system thereof.

Referring to FIGS. 4, 5 and 6 there is shown a sprayer 1 including a sprayer frame 2 and a sprayer tank 3 which, in this embodiment, are supported by wheels 4 allowing for the forward movement of the sprayer (but it is to be noted that in another embodiment the sprayer could, instead, be a cart which is towed by a self-propelled unit such as a tractor). A parallel linkage 5 and a main boom hydraulic lift cylinder 6 attach at one end thereof to the sprayer frame 2 and at the opposite end thereof to a boom support frame 7. In this embodiment, the overall boom height adjustment illustrated by FIG. 1 is performed by adjusting the lift cylinder 6 so as to cause it to lift (or lower) the boom support frame 7 and thereby adjust the height of the entire boom of the sprayer. An alternative means to achieve this vertical adjustment may be to instead use vertical sliding rails. It is to be noted, however, that this boom height adjustment is not relevant to the invention claimed herein.

Figure 3:
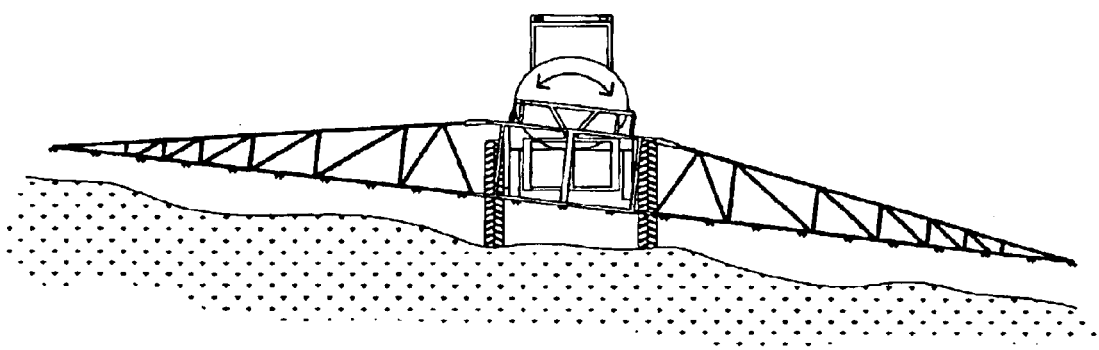

Each of a roll frame 8 and a center boom frame 9 are coupled to the boom support frame 7 to permit clockwise or counterclockwise rotation relative thereto. This is done by a pivot pin 10 which provides a pivotal attachment to allow for rotational movement of the center boom frame 9. The roll frame 8 is also pivotally attached by pin 10 and is able to move rotationally (i.e. independent of any rotational movement by the center boom frame 9). The roll frame 8 is a rigid structure (made of steel in this embodiment) and is connected to the boom support frame 7 with a roll hydraulic cylinder 11. As the roll cylinder 11 extends (or retracts) it causes the roll frame 8 to rotate in a counterclockwise (or clockwise) direction. This exerts a torque on the center boom frame 9 through a damper 13, as well as through centering springs 12 in this particular embodiment for which two are installed as shown at each side of the roll frame 8 and, in turn, this causes the entire boom framework to rotate as illustrated by FIG. 3 until forces on the boom equalize and a new roll position is established. The roll frame 8 and cylinder 11 (with its associated operating valve 26) together function as a roll control mechanism for rotating the boom relative to the support frame in response to a roll control signal 27 produced by a controller 25.

Figure 7:
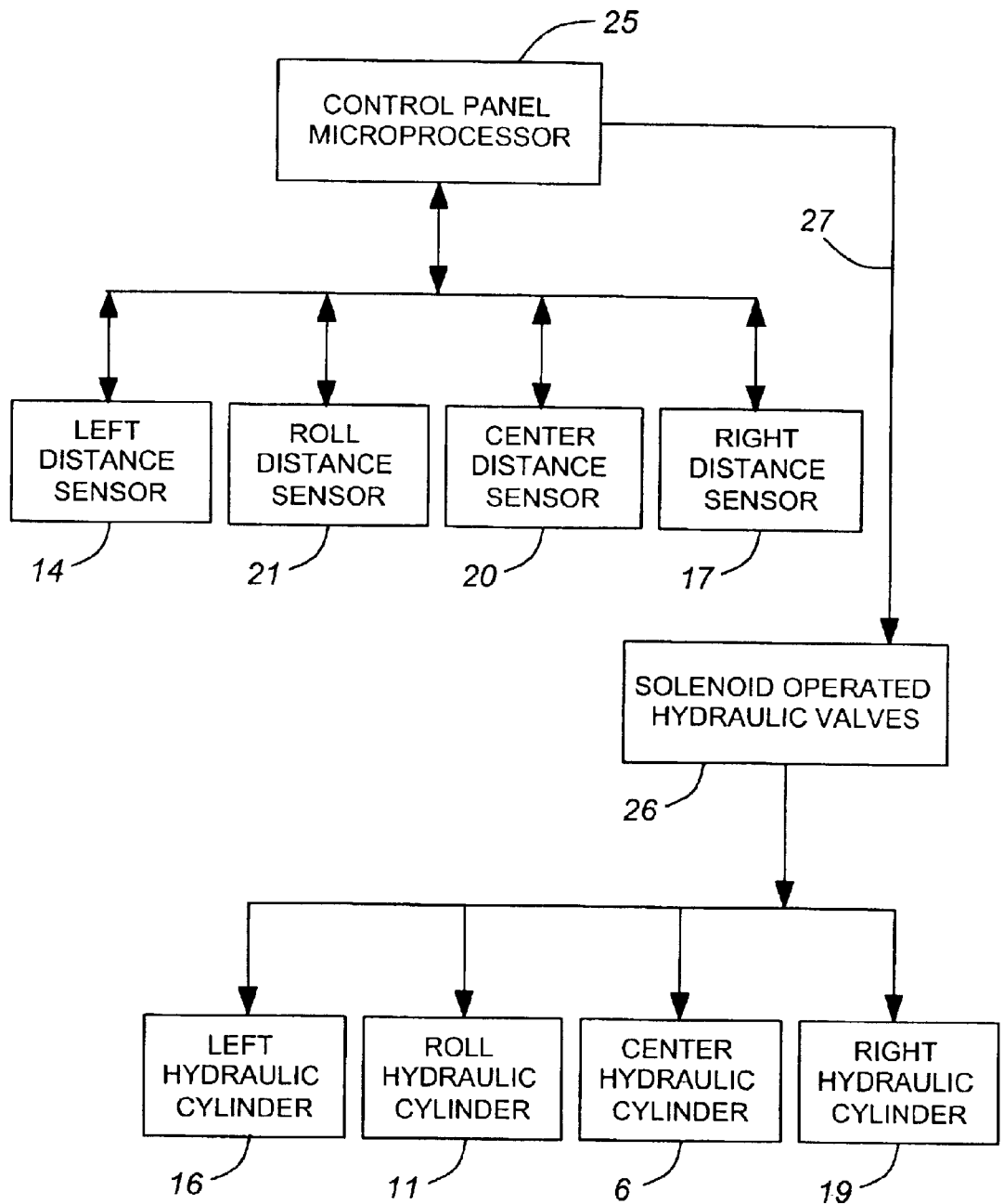
FIG. 7 is a block diagram of a boom height control system in accordance with the invention.

The boom roll control system is provided in this embodiment by distance measurement devices 14, 17 and 21 mounted as shown and comprising ultrasonic sound echo sensors, a controller in the form of a microprocessor 25 (shown in FIG. 7 but not shown in FIGS. 4–6), a roll hydraulic cylinder 11 and its associated operating valve (within valve bank 26), for rotating the boom (causing a roll). The controller 25 receives and processes distance measurement information signals from the devices 14, 17 and 21 and produces therefrom a roll control signal 27 configured to drive the valve within valve bank 26 which operates the roll hydraulic cylinder 11 (i.e. causes its extension member to move in or out), as appropriate, to control the roll of the boom and, thus, in turn, assist in controlling the height of the boom along its length over the spray target. FIGS. 4 and 5 show the layout of distance measurement devices (sensors) in the illustrated embodiment.

Wing section position measuring apparatus is provided by left and right wing sensors 14, 17. Left wing sensor 14 produces a left wing signal correlating to the distance from the sensor 14 to a reference position (being shown as ground in the drawings to represent the spray target) and this distance represents the height of the left wing section 15. Apart from the roll control system of this invention, this wing-to-ground distance measurement is also used by the controller 25 to control the height of the left wing 15 by means of the left wing cylinder 16 (and, similarly, the output signal of right wing sensor 17 is used to control the height of the right wing section 18 by means of the right wing cylinder 19). A center boom sensor 20 produces a signal which correlates to the distance from the sensor 20 to the ground and this distance represents the height of the center boom 9. Also apart from the roll control system of this invention, this boom-to-ground measurement is used by the controller 25 to control the height of the entire boom (i.e. By moving the boom support frame 7 and center boom frame 9 attached thereto to which the wings are attached) by means of a main boom lift cylinder 6. These wing tip and boom height control features are identified herein for purposes of information only, however, and it is to be understood that they are not a part of the roll control system of the present invention.

The distance measurement device 21 provides to the controller 25 dynamic distance measurement information that is associated with the roll action of the boom at the time the measurement is produced. Specifically, in this embodiment an ultrasonic sound echo sensor 21 is used to measure the distance between the sensor 21 and a boom roll reference being a fixed spring target 22 (referred to herein as the "spring target distance"). The spring target distance measured by sensor 21 correlates to the extension of centering springs 12 and, in turn, to the roll action of the boom. As shown by the control system block diagram of FIG. 7, this spring target measurement is used in combination with the two wing sensor readings to form the basis of the roll control system of this invention as claimed herein. That is, the distance measurements associated with the outputs of the three sensors 21, 14 and 17 are used by the controller 25 to produce a roll control signal which functions to drive the valve within valve bank 26 which feeds the roll hydraulic cylinder 11 to adjust the extension of thereof and thereby apply a roll torque in accordance with the calculations of the controller 25. It is to be understood by a person skilled in the art that the valves of the valve bank 26 connect to the hydraulic cylinders through hoses and operate (i.e. Opener) independently of each other under either the control of the controller 25 or a manual override mechanism (not shown in the drawings, but such override mechanisms being well known and typically provided for safety purposes). Each valve in the valve bank 26 functions to control its associated cylinder i.e. a roll cylinder valve controls the roll hydraulic cylinder, a right wing hydraulic valve controls a hydraulic cylinder for the right wing of the boom, etc. For the illustrated embodiment proportional valves were selected for use, whereby the flow of oil to the hydraulic cylinder associated with each valve is proportionally controlled in accordance with the control signal fed from the controller 25 to that valve.

The sensor 21 comprises an ultrasonic sound transducer for transmission and reception, as known in the art (alternatively, a separate transmitter and receiver may be used). The sensor 21 also comprises processing means, in the form of a microprocessor, configured for processing a received ultrasonic sound echo to filter out noise and other error-inducing information and for converting the filtered sound echo to a numerical value (e.g. x millimeters). Communications circuitry configured for communicating that value to the controller 25 is also provided by the sensor 21.

For the particular embodiment of the invention illustrated herein, the controller 25 selected for use comprises a microprocessor having an 8051 architecture. However, the reader will understand that numerous other specific controllers could also be appropriately configured and used to implement the invention, one general category of such alternative devices being programmable logic controllers (PAC's) which are well known to persons skilled in the art of control systems. The functions performed by the controller 25 include receiving and processing distance information from the sensors (e.g. The roll distance sensor 21 and the left and right distance sensors 14, 17), optionally providing an operator interface permitting an operator to set the system mode as automatic or manual (but this functionality may instead be configured separately from the controller 25, according to the chosen design), processing an algorithm in accordance with the invention to determine an output roll control signal and valve drivers for transmitting the roll control signal to the associated roll valve in valve bank 26.

Figure 8:
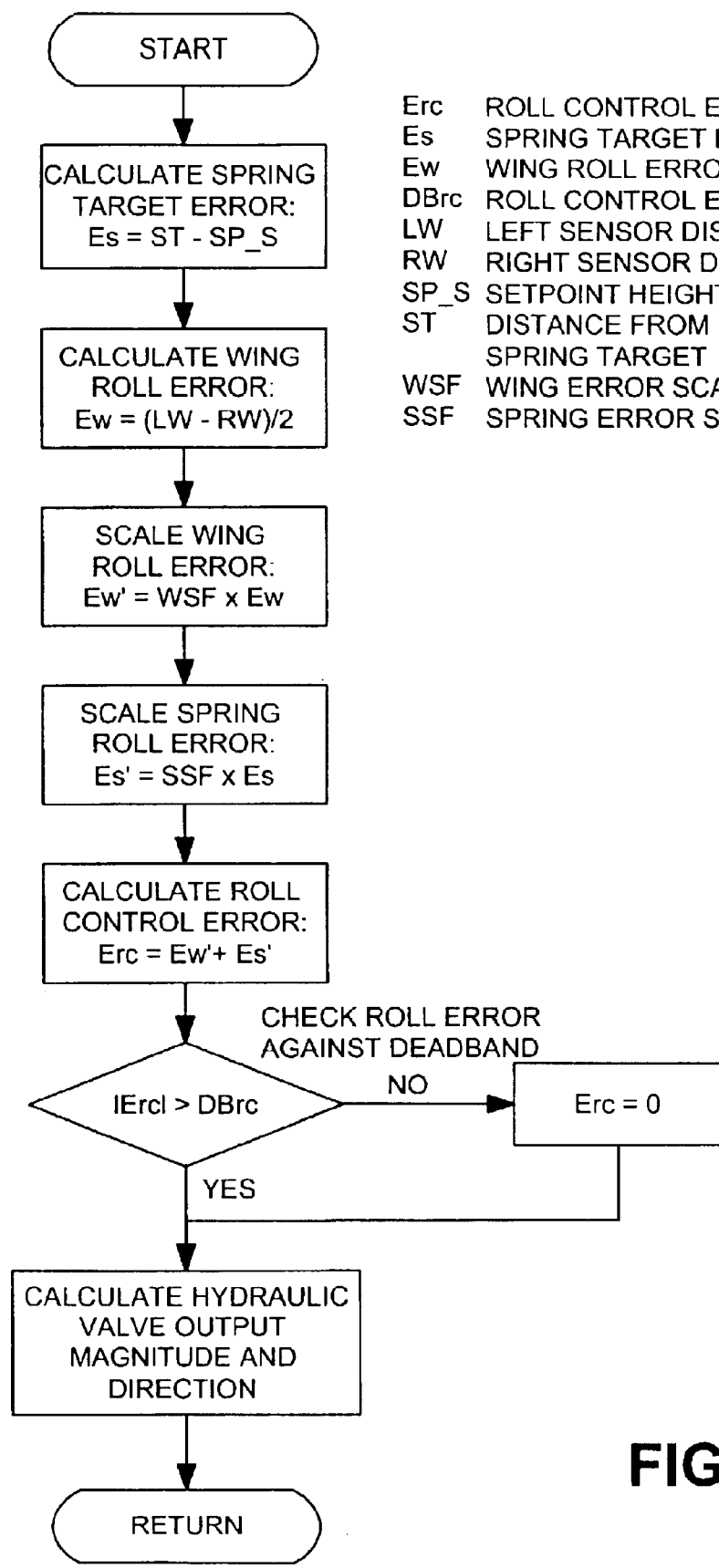
FIG. 8 is a flow chart of the steps/calculations performed by a microprocessor of the boom height control system of FIG. 7; and, FIG. 9 is a front elevation partial view of a boom assembly attached to a sprayer and having a boom height control system, with an alternate embodiment of the roll control component in accordance with the invention.

As shown by the flow chart of FIG. 8, the controller 25 performs calculations based on the distance measurement information signals generated by the roll sensor 21 and left and right wing sensors 14, 17 and, in the result, a boom roll control error value (Erc) is calculated, based upon a combination of a wing section differential value (Ew) and a boom roll value (Es) (alternately referred to herein, specifically in FIG. 8, as the wing roll error (Ew) and spring roll error (Es), respectively). The boom roll control error (Erc) is used by the controller 25 to calculate cylinder extension magnitude and direction control signals to drive the hydraulic valves 26 and operate the roll cylinder 11 according to the controller's calculations. The microprocessor 25 calculates a boom roll value (Es) equal to the measured spring target distance (ST) minus a set point height (SP_S), whereby the set point height is a reference target distance representing a reference roll position for the boom. It also calculates a wing section differential value (Ew) equal to one-half of the difference between the left wing-to-ground distance measurement (LW) and the right wing-to-ground distance measurement (RW).

Each of the boom roll (Es) and wing section differential (Ew) values are scaled, by scaling factors (WSF and SSF, respectively), being a number which is typically less than 1, to produce scaled boom roll and wing section differential values (Es', Ew'). As will be understood by the skilled reader, these scaling factors are used to determine the responsiveness of the control action and the specific values to be assigned to these scaling factors will be different for any given implementation of this invention, depending upon the boom dimensions and other dynamics of the particular equipment (e.g. sprayer) used for such implementation. As is well known by persons skilled in the art, standard control theory and scale factor testing is to be used for a given implementation in order to optimize the performance of the controller 25.

A roll control error value (Erc) equal to the sum of the scaled boom roll and wing section differential values (Es'+EW') is then calculated by the controller 25. The absolute value of the roll control error value (i.e. to remove the roll direction information) is then compared to a roll control error deadband value (Dbrc) to make sure that it is greater than that deadband value and, if it is, the controller 25 produces a control signal from the roll control error value calculated to drive the roll cylinder valve of the valve bank 26 and adjust the roll cylinder 11 to control the roll action of the boom in accordance with the calculations of the controller 25. If the roll control error value (Erc) is not more than the roll control error deadband value (Dbrc) it is set to zero and no adjustment is made to the roll action of the boom. The purpose for applying this deadband comparison is to ensure that an equilibrium point can be achieved by the control system whereby the control action ceases (i.e. at which the control signal 27 becomes inactive). Without such facilitation of an equilibrium point the control system would be subject to greater wear.

The following primary roll control functions are accomplished by the roll control algorithm of FIG. 8 using the foregoing combination of distance measurements:

1. A first roll control function is to reduce boom height errors introduced by the spray vehicle itself when the wheels 4 pass over uneven ground and cause the entire boom to move into an unlevel condition. For instance, if a left wheel were to ride up onto a ridge, that would force each of the sprayer frame 2, boom support frame 7 and roll frame 8 to rotate in a clockwise direction since these frames are linked together. As this rotation takes place there is a time delay before the springs 12 and damper 13 create sufficient force to rotate the center boom frame 9 due to the inertia of the entire boom. During this time delay the distance measured by the roll sensor 21 will increase and, therefore, the controller 25 initiates a roll adjustment by causing the roll cylinder 11 to extend in such a manner as to cause the distance measured by the roll sensor 21 to return to its neutral point being the setpoint height value (SP_S). In effect, the operation of the controller 25 continuously seeks to maintain the spring target distance at a constant value equal to the setpoint height (SP_S) when the left and right wing sensors are measuring about the same distance (see below).

2. A second roll control function is to help reduce the roll error that may exist between the opposite wing tips of the entire boom since the calculated roll control error value (Erc) is also dependent on the wing roll error (Ew) (i.e. in addition to being dependent on the spring target error). If the left wing sensor 14 is higher than the right wing sensor 17 then a counterclockwise roll correction may be initiated by the control system. Equally, if the right wing sensor 17 is higher than the left wing sensor 14 then a clockwise correction may take place to correct this (but depending also on the distance measurement information determined from the roll sensor 21). In either of these two situations the controller 25 operates to cause the roll cylinder 11 to extend or retract (according to the rotational direction needed) so that forces applied by the springs 12 and damper 13 assist to bring the boom back to a level condition i.e. a condition in which the entire boom is approximately parallel with the ground. The specific action of the controller is to adjust the roll cylinder 11 such that the spring target error (being the difference between the distance measured by the roll sensor 21 and the setpoint height value) is proportional to the differential error measured by the wing sensors 14, 17.

3. A third roll control function is to help stabilize the boom. When a roll error exists the forces applied by the centering springs 12 cause the boom to begin rotation towards a neutral position and as it does the spring forces approach equilibrium. However, because the boom has rotational momentum there is a tendency, absent the roll control system, for the entire boom to rotate past (i.e. over shoot) the neutral position and create and roll error in the opposite direction. This, in turn, causes a balancing adjustment in the opposite direction and the process is repeated, creating instability and unnecessary boom height errors. The roll control system of the present invention helps to stabilize the boom as it approaches a level condition. That is, as the boom approaches a level condition the roll frame 8 is caused to rotate in the opposite direction and the forces applied by the damper 13 then reduce the rotational momentum of the boom to reduce or essentially eliminate the overshoot of the boom. This has the effect of producing a more stable boom, thereby reducing height errors. Moreover, in accordance with standard control theory, establishing a more stable boom allows for high control system gains which improves the response speed of the entire height control system.

In combining the foregoing roll control functions the invention provides an active, intelligent roll control system for suspended booms having substantially improved performance over the basic known height control systems, the term "suspended boom" herein referring to a boom configuration in which the boom has no direct contact with the ground. Moreover, this combination of height and roll control can be generally applied to any agricultural, industrial or construction equipment that utilizes both height and roll controls.

Figure 9:
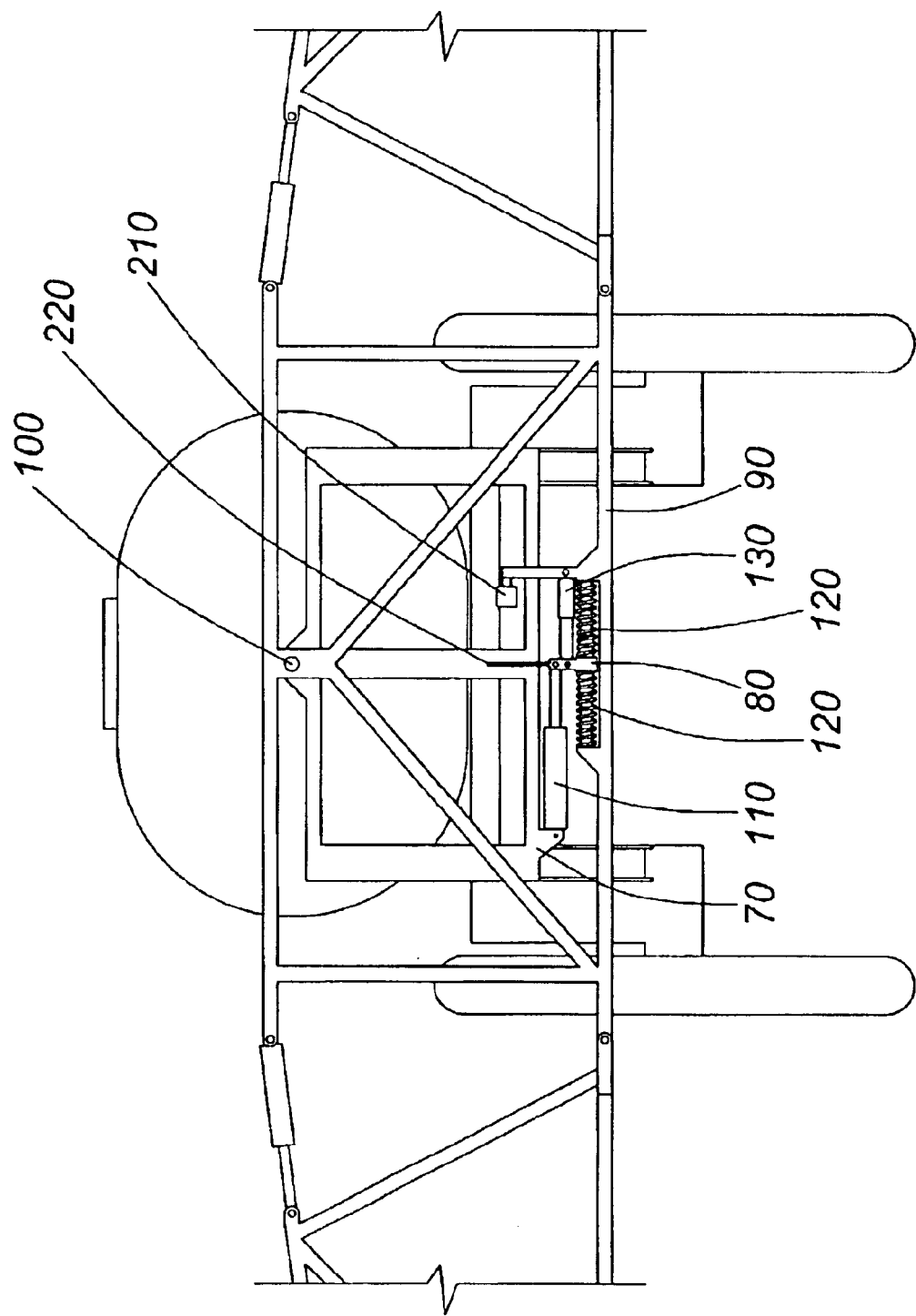

For the embodiment shown by FIGS. 4–6 the boom roll mechanism is provided by a roll frame 8 with a roll cylinder 11 coupling it to the boom support frame and springs 12 and damper 13 coupling it to the center boom 9. It is to be understood, however, that alternative roll mechanisms may be appropriately designed for use in any given application (i.e. instead of that shown by FIGS. 4–6). One example of such an alternative is shown by FIG. 9 in which the roll of the boom is controlled by means of a horizontally extending roll cylinder 110 and a roll bracket 80, whereby the roll bracket 80 takes the place of the roll frame 8 of the embodiment of FIGS. 4–6. Functionally, however, this alternate embodiment controls the boom roll in similar manner to the boom roll mechanism shown in FIGS. 4–6. In FIG. 9 a pivot pin 100 couples a boom support frame 70 to a center boom frame 90 and a roll sensor 210 measures the distance to a spring target 220. The roll bracket 80 is connected to the boom support frame 70 with the roll hydraulic cylinder 110 which, when extended and retracted causes the roll bracket 80 to slide on a shaft (not shown) which acts as a guide for compression springs 120 coupled to the center boom frame 90. The roll bracket 80 couples together the cylinder 110, a damper 130, both springs 120 and a spring target 220.

Optionally, it may be desired to incorporate into the control system a control mechanism for keeping the center boom 9, on average, parallel with the boom support frame 7. For such option, the sensor 21 can also be used to determine the relative position of the center boom 9 to the boom support frame 7, whereby the position of a second target 23 mounted to the boom support frame 7 (see FIG. 5) is also measured by sensor 21. By using an ultrasonic echo sensor for sensor 21 only that (one) sensor is needed to do this but a separate distance or angular sensor could also be used.

Optionally, if the roll sensor 21 is appropriately oriented (such as that shown by FIG. 5), the sensor 21 can also be used to determine the height of the center boom 9 so as to eliminate the need for the separate center boom height sensor 20. As shown by FIG. 5, a boom support frame target distance (REF) plus an offset (as shown) are subtracted from a sensor-measured distance to the spray target (ground) to determine the center boom height.

The individual electronic and processing functions utilised in the foregoing described embodiments are, individually, well understood by those skilled in the art. It is to be understood by the reader that a variety of other implementations may be devised by skilled persons for substitution. Persons skilled in the field electronic control systems for machines will be readily able to apply the present invention to an appropriate implementation for a desired application. It is to be understood that the specific types and configurations of the machine components described herein with reference to the illustrated embodiments are not intended to limit the invention; for example, the invention is not intended to be limited to any specific configuration or type of boom, nor to any specific arrangement or type of distance measurement devices or roll mechanism, for which various alternative embodiments may be determined by one skilled in the art based upon the teachings herein and the particular application.

Consequently, it is to be understood that the particular embodiment shown and described herein by way of illustration is not intended to limit the scope of the invention claimed by the inventors which is defined by the appended claims.

What is claimed is:

1. A roll control system for controlling a roll position of a boom coupled to a support frame to permit clockwise or counterclockwise rotation relative thereto, the boom comprising left and right wing sections and the roll position representing a measure of such rotation, said roll control system comprising:

(a) a roll control mechanism configured for rotating said boom relative to said support frame in response to a roll control signal provided thereto;

(b) wing section position measuring apparatus configured for producing a right wing signal correlatable to a distance between said right wing section and a right wing reference position and a left wing signal correlatable to a distance between said left wing section and a left wing reference position;

(c) boom roll position measuring apparatus configured for producing a boom roll signal correlatable to a roll position of said boom; and, (d) a controller configured for: (i) identifying a wing section differential value and a boom roll value derived from said right and left wing signals and said boom roll signal, respectively; and, (ii) identifying a boom roll control error value derived from said wing section differential value and said boom roll value, said boom roll control error value being configured for deriving therefrom said roll control signal.

2. A roll control system according to claim 1 wherein said wing section position measuring apparatus comprises:

(a) a first distance measuring component configured for producing said right wing signal; and, (b) a second distance measuring component configured for producing said left wing signal.

3. A roll control system according to claim 2 wherein said boom roll position measuring apparatus comprises a third distance measuring component configured for producing said boom roll signal.

4. A roll control system according to claim 1 wherein a damper couples said roll frame and said boom.

5. A roll control system according to claim 4 wherein said first, second and third measuring components comprise ultrasonic sound echo sensors, said first measuring component located at or near a terminal end of said left wing section and said second measuring component located at or near a terminal end of said right wing section.

6. A roll control system according to claim 5 wherein said controller comprises a microprocessor.

7. A roll control system according to claim 5 wherein said roll control mechanism comprises a roll frame coupled to said support frame by a pivotal coupling and by extension/retraction means spaced from said pivotal coupling.

8. A roll control system according to claim 7 wherein said third measuring component is located on said roll frame.

9. A roll control system according to claim 8 wherein at least one spring couples said roll frame and said boom.

10. A roll control system according to claim 7 wherein said extension/retraction means comprises a hydraulic cylinder and a hydraulic valve configured for causing said cylinder to extend or retract in response to said roll control signal.

11. A roll control system according to claim 1 wherein said boom roll error control value is derived from said wing section differential value scaled by a first scaling factor and said boom roll value scaled by a second scaling factor.

12. A roll control system according to claim 1 wherein said left wing and right wing reference position is a ground reference.

13. A roll control system according to claim 1 wherein said controller compares said boom roll control error value to a deadband value and sets said boom roll control error value to zero when said comparison identifies that said boom roll control error value is less than said deadband value.

14. A method for controlling a roll position of a boom coupled to a support frame to permit clockwise or counterclockwise rotation relative thereto, the boom comprising left and right wing sections and the roll position representing a measure of such rotation, said method comprising:

(a) producing a right wing signal correlatable to a distance between said right wing section and a right wing reference position;

(b) producing a left wing signal correlatable to a distance between said left wing section and a left wing reference position;

(c) producing a boom roll signal correlatable to a roll position of said boom;

(d) deriving a wing section differential value and a boom roll value from said right and left wing signals and said boom roll signal, respectively;

(e) deriving a boom roll control error value from said wing section differential value and said boom roll value;

(f) producing a roll control signal using said boom roll control error value; and, (g) rotating said boom relative to said support frame in response to said roll control signal.

15. A method according to claim 14 and further comprising scaling said wing section differential value by a first scaling factor and scaling said boom roll value by a second scaling factor.

16. A method according to claim 14 whereby said left wing and right wing reference position is a ground reference.

17. A method according to claim 14 and further comprising comparing said boom roll control error value to a deadband value and setting said boom roll control error value to zero when said comparison identifies that said boom roll control error value is less than said deadband value.

* * * * *